United States Patent [19]

Hartemink

[11] 4,450,718

[45] May 29, 1984

[54] FLOW METER INCLUDING IMPROVED LAMINAR FLOW RESTRICTOR DEVICE THEREFOR

[75] Inventor: Gerrit A. Hartemink, Harderwijk, Netherlands

[73] Assignee: Advanced Semiconductor Materials N.V., Bilthoven, Netherlands

[21] Appl. No.: 369,660

[22] Filed: Apr. 19, 1982

[51] Int. Cl.³ .............................................. G01F 5/00
[52] U.S. Cl. ...................................... 73/202; 138/42
[58] Field of Search .................... 73/202, 203; 138/42, 138/43; 137/625.28, 625.3

[56] References Cited

U.S. PATENT DOCUMENTS

| 3,514,074 | 5/1970 | Self | 138/42 |
| 3,792,609 | 2/1974 | Blair et al. | 73/202 |
| 3,851,520 | 12/1974 | Drexel | 73/202 |

*Primary Examiner*—Herbert Goldstein

[57] ABSTRACT

This disclosure relates to a flow meter having an improved flow restrictor for creating laminar flow in the flow meter. The improved flow restrictor is an adjustable bypass or flow restrictor which comprises a stack of alternate slotted discs and non-slotted, smaller diameter, washers with a diameter of 80% of the slotted discs, to form a plurality of micro-channels 0.09 mm square and 3 mm long which is a length to area ratio sufficient to assure laminar fluid flow through the flow meter.

10 Claims, 5 Drawing Figures

FLOW METER INCLUDING IMPROVED LAMINAR FLOW RESTRICTOR DEVICE THEREFOR

BACKGROUND OF THE INVENTION

1. Field of the Invention

This invention relates generally to flow meters and methods of flow meter operation and more particularly, to flow meters and methods of flow meter operation having flow restrictors for insuring laminar flow in the flow meter.

2. Description of the Prior Art

The prior art contains a number of examples of flow meters using manometers for measurement of pressure differentials created by various types of flow restrictors such as orifices, needle valves, porous plugs or a multi-path assembly of capillary tubes with a high length to diameter ratio. There are also examples of flow meters where instead of measuring a pressure differential, a small percentage of fluid flow is diverted to a capillary where the rate of flow is evaluated by various external means. Flow meters based on in-stream rotary vanes and rotameters do not usually use flow restrictors or by-pass arrangements except for setting the range of flow.

For obtaining maximum accuracy in flow measurement, it is very desirable to insure that laminar flow is achieved through the flow meter at least between the input and output portions of a measurement loop used to measure the flow rate of the fluid flow through the flow meter. Thus, for example, it is extremely critical in order to accurately control deposition rates of the fluid at an upstream control location that the flow meter read-out or indication be linear or truly representative of the rate of fluid flow.

One of the major obstacles in achieving the ultimate objective of accurately controlling deposition rates which can, for example, be extremely critical in the fabrication of complex Integrated Circuits or Chips forming parts of a semiconductor wafer, is to obtain and maintain laminar flow (over a large range of pressure differentials) through the flow meter measuring the rate of flow of a fluid through a deposition apparatus.

In the past, various techniques were developed to obtain laminar flow in a flow meter. For example, U.S. Pat. No. 3,851,526 discloses various flow restrictor configurations or embodiments for attempting to obtain laminar flow in a flow meter. In this specific prior art patent example, ducts or grooves were formed either ordinarily on or radially through discs in a pattern emanating from a center hole in each disc. Various disc embodiments were disclosed each having specific flow path lengths and configurations. A major problem associated with the various disclosed discs of this prior art patent is the complexity of fabrication.

A need existed to provide a simpler and less complex (and therefore less costly) flow restrictor configuration that would achieve the goal of obtaining laminar flow through a flow meter. A further need existed for a simpler and less complex flow restrictor for a flow meter which will provide laminar flow characteristics over a reasonable range of fluid flow and fluid temperature and which can be adjusted in small repeatable increments of flow restriction.

SUMMARY OF THE INVENTION

It is, therefore, an object of the present invention to provide an improved flow meter and method of flow meter operation.

It is a further object of this invention to provide an improved flow meter having an improved flow restrictor.

It is a further object of this invention to provide an improved flow meter and method of flow meter operation having an improved adjustable flow restrictor.

BRIEF DESCRIPTION OF THE PREFERRED EMBODIMENTS

In accordance with one embodiment of this invention, there is provided in a flow meter, a flow restrictor assembly comprising, in combination, inlet means for introducing a fluid located within said flow meter with an input portion of said flow restrictor; flow restrictor means coupled to said inlet means for creating laminar fluid flow, said flow restrictor means comprising a first plurality of washers each having a center aperture, and a second plurality of discs each having a center aperture and a plurality of radially extending slots passing through the front and rear surfaces of each disc and in communication with said center aperture, each one of said second plurality of discs being located between a pair of said first plurality of washers, the center apertures of said first plurality of washers being lined up with the center apertures of said second plurality of discs; and outlet means for permitting the laminar fluid to flow out an output portion of said flow restrictor, said outlet means comprising all the center apertures of said first plurality of washers and said second plurality of discs and said plurality of radially extending slots in communication with said center apertures of said second plurality of discs.

In accordance with another embodiment of this invention, there is provided a method for creating laminar fluid flow in a flow meter comprising the steps of: providing a first plurality of washers each having a center aperture; providing a second plurality of discs each having a center aperture and a plurality of slots extending radially from said center aperture of said disc; and forming a flow restrictor to create laminar fluid flow in a flow meter by alternately stacking washers and discs together with each disc being between two washers thereby providing, in combination a plurality of channels in each of said discs for carrying fluid through each of said discs for creating laminar fluid flow.

The foregoing and other objects, features and advantages of this invention will be apparent from the following more particular description of the preferred embodiments of the invention as illustrated in the accompanying drawings.

Figure 1:
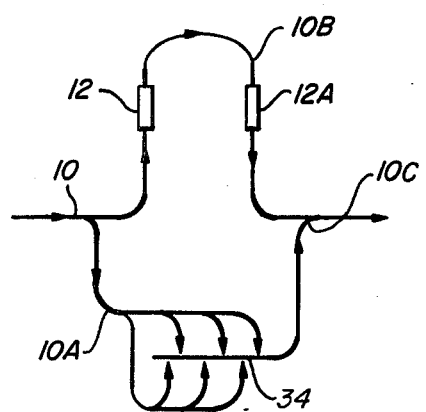
FIG. 1 is a schematic diagram of both the measurement flow path and the restrictor flow path within the flow meter of this invention.
Figure 2:
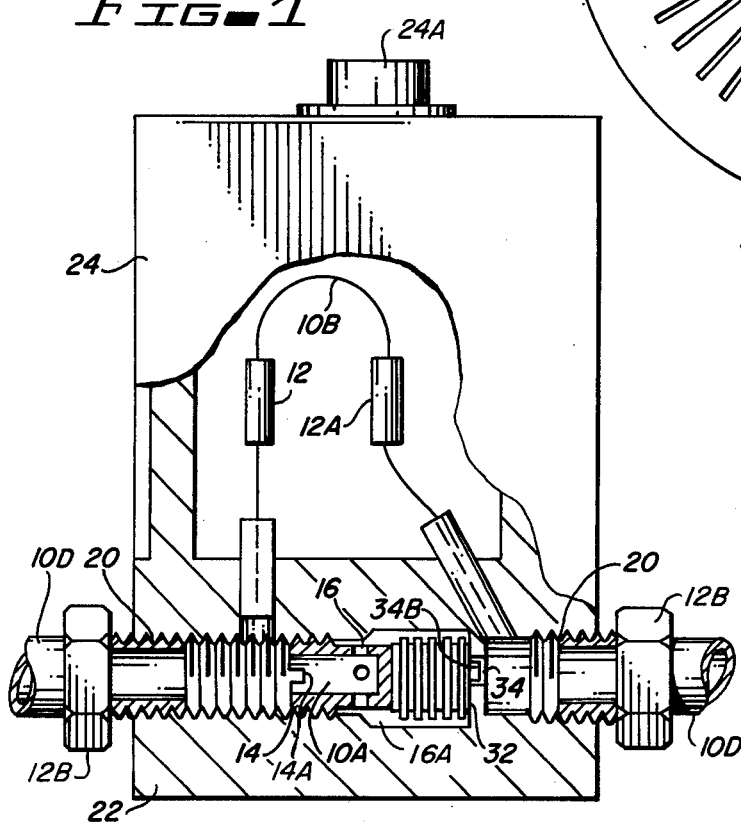
FIG. 2 is an elevational, partially cut away, sectional view of the flow meter of this invention showing both the measurement channel or path and details of the flow restrictor arrangement along the main fluid flow path.

Reference to FIG. 1 shows two distinct flow paths through the disclosed flow meter device of FIG. 2. Flow input 10 branches into paths 10A and 10B. The flow path 10B is a fluid flow measurement path. The path 10A is a schematic representation of the flow restrictor assembly of FIG. 2 where flow is from a plurality of apertures (formed by the outer portions of the slots in the disc of FIG. 4) located in a circle approximately one millimeter in from the outer perimeter of the FIG. 4 disc or discs which are perferably about 11.8 mms in diameter thence in a radial direction downward or inward along all the radial slots or slits to a hole in the center of the disc (which hole is 4 mms in diameter) and through hole 34 (see FIGS. 2 and 3) to a point 10C (see FIG. 1) where recombination with the flow path 10B occurs. Shown on the path 10B of FIG. 1 are sensor elements 12 and 12A which measure fluid flow in a measurement loop in a manner well known in the art and not a part of this disclosure.

FIG. 2 shows an external view of flow meter 24 partly cut away to show the interior portion of the flow meter 24 including a base member 22. Illustrated schematically in FIG. 2 is the flow meter measurement path or capillary 10B with the (preferably resistor) sensing elements 12 and 12A and the main flow path in and out of the flow meter 24. Shown at 24A is a socket for connecting the sensing elements 12/12A to external circuits (not shown).

Input/output tubing 10D is fastened to the flow meter 24 by hexagon nuts 12B and conventional compression fittings screwed into internal threads 20 which are a part of the inlet and outlet before and after the restrictor assembly. The flow resistor assembly comprises an externally threaded hollow retaining fixture 14 which has a screw driver slot 14A to facilitate its installation within the flow meter. Approximately one half of the downstream length of the hollow retaining fixture 14 (see FIG. 3 for greater clarity) is not threaded and has a smaller external diameter equal to approximately 80% of the threaded diameter portion of the fixture 14 thus leaving a circular chamber 16A. Four holes 16 allow a fluid entering the input portion of the hollow fixture 14 to move outwardly and reach the cavity or chamber 16A and then flow through the capillary channels formed by alternately stacked discs 28 and washers 32 (see FIGS. 4 and 5 for a clearer view of a disc 28 and a washer 32) to outlet center hole 34 and thence along the outlet center hole 34 and the output portion of the restrictor or retaining fixture 14.

Figure 3:
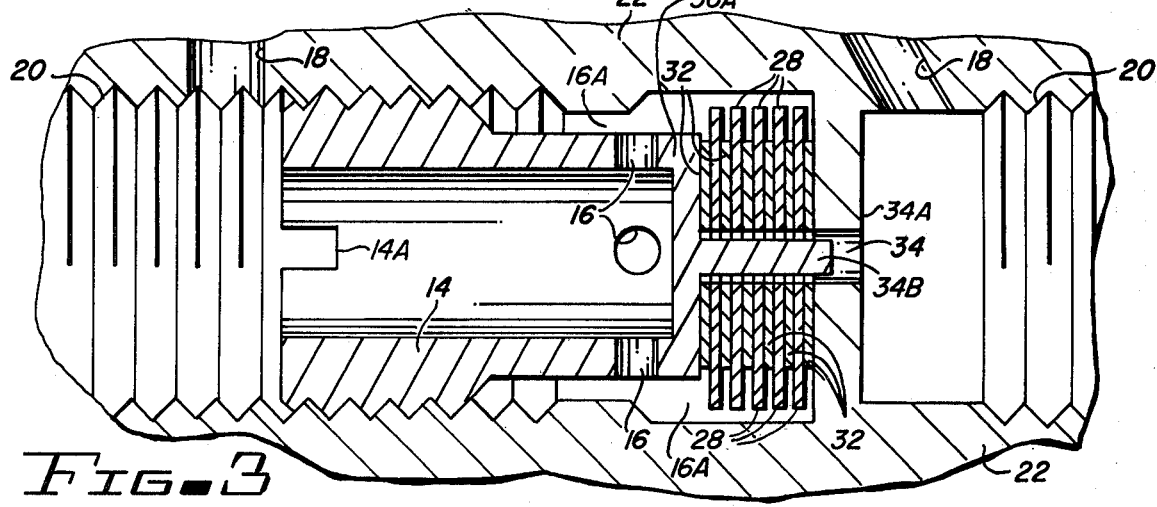
FIG. 3 is an enlarged cross sectional view of the flow restrictor assembly of FIG. 2 using multiple discs.

FIG. 3 is an enlarged sectional view showing, in greater detail, the restrictor assembly shown in FIG. 2. The internally threaded inlet and outlet portions of the restrictor assembly are shown more clearly in FIG. 3. Passage or conduit 18 connects to the flow meter capillary 10B (see FIG. 2). The retaining fixture 14 is shown installed with its intermediate blind or imperforate wall portion 34A holding a stack of the center apertured washers 32 alternating with the slotted or slitted, capillary center apertured discs 28 within the cavity which is formed by the space located between the inside of the wall portion 16A and the outside of cap member 36A which is located at the output end portion of the retaining fixture 14 in front of the stack of alternate washers 32 and disc 28. This cavity is machined within the base member 22 to allow the discs 28 a clearance of 0.1 mms from the edge of the discs 28 to the wall of cavity 16A to allow fluid flow around the periphery of the discs 28. Holes 16 which are radial allow the fluid in the flow meter to flow through the hollow center of the retaining fixture 14 to reach the circular chamber 16A and then flow into the cavity space located between the inside of the wall portion 34A and the outside of the cap member 36A and then radially inward through the slits in each of the discs 28 and out through the center output hole 34 which has the same diameter as the center holes in the washers 32 and the discs 28 and is formed by all the center holes 34 of each of the center holes of the washers 32 and the discs 28. Each disc 28 and 32 is accurately centered in the cavity space 16A by a triangular extension 34B attached to the end of retaining fixture 14. These center apertured washers 32 and 28 are centered by the triangular extension 34B on retaining fixture 14 which is accurately dimensioned to fit the center holes of washers 28 and 32 with a clearance of not more than 0.05 mms. Fluid flow is from cavity 16A through the capillary slits 30 in washers 28 to the center hole 34 and outward through the gaps around triangular extension 34B. The stack of the washers 32 and the discs 28 is immobilized or fixed in place by tensioning the retaining fixture 14 against the stack with a screwdriver inserted in the slot 14A.

Figure 4:
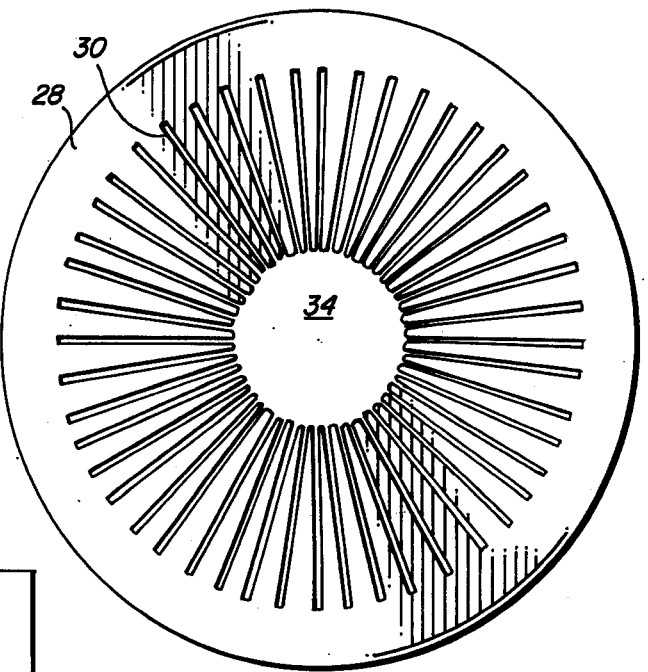
FIG. 4 is an enlarged elevational view of a single flow restrictor disc having a center hole or opening and showing a plurality of uniform width radial slots or slits going through the disc from the front to back surfaces thereof.

FIG. 4 shows a greatly enlarged view of one of the capillary or slotted discs 28 used in the flow restrictor protion of the flow meter. In a practical example of a preferred embodiment of one of the discs 28 in use, the disc diameter is 11.8 mms, the disc thickness is 0.09 mms. Forty slits 30 (although forty-eight slits are shown in FIG. 4) in the disc 28 are preferably chemically milled from points 1.0 mms from the edge of the disc 28 directly to the center hole 34. This forms a circle of spaced apart slits equivalent to a circle 10.8 mms in diameter. Width of each of the forty slits 30 is preferably 0.09 mms which is equal to the disc thickness. The center hole diameter 34 is preferably 4.0 mms.

Figure 5:
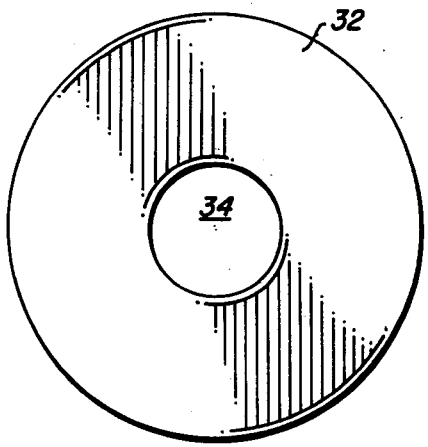
FIG. 5 is an enlarged view of a flat washer member (having a center hole or opening) which is used together with the slotted or slitted disc of FIG. 4 in the flow restrictor of FIGS. 2 and 3.

FIG. 5 shows an enlarged view of one of the washers 32 which when centered on each of the (or opposite) sides of each of the discs 28, permits each slit 30 to be a capillary channel 0.09 mms square. Preferably the diameter of each of the spacing washers 32 is 10 mms, diameter of the center hole 32 is the same as for the discs 28 which is 4.0 mms and the washer thickness is 0.09 mms. Thus, the length of each capillary channel formed with the covered disc 28 is approximately 3.0 mms.

OPERATION OF THE FLOW RESTRICTOR

From the specification, it can be shown the preferred minimum number of capillary channels formed by one of the restrictor discs 28 is forty and the number of channels increases in increments of 40 as each of the discs 28 is added to the alternating washers 32. More than twenty discs can be accommodated in the cavity space formed by the inside portion of the member 34A and the outside portion of the cap 36A. Dimensions of the flow restrictor components depicted in this specification are based on an actual fluid flow meter and are furnished only as one example thereof. Variations of the dimensions of the flow restrictor components can be made, as desired. Furthermore, the diameter of the retaining fixture 14, threaded section 20, and the cavity space which includes chamber 16A can be altered, as desired, to accommodate different flow rates. The disc and washer diameters can also be changed, as desired. Also, the number of the slits 30 in each of the discs 28 (see FIG. 4) can also be changed, the only constraint being that the channel length to diameter ratio be kept high enough to maintain laminar flow at flow rates of interest through the flow restrictor assembly.

While the invention has been described with respect to a preferred physical embodiment constructed in accordance therewith, it will be apparent to those skilled in the art that various modifications and improvements may be made without departing from the scope and spirit of the invention.

What is claimed is:

1. In a flow meter, a flow restrictor assembly comprising, in combination, inlet means for introducing a fluid located within said flow meter with an input portion of said flow restrictor; flow restrictor means coupled to said inlet means for creating laminar fluid flow, said flow restrictor means comprising a first plurality of washers each having a center aperture, and a second plurality of discs each having a center aperture and a plurality of radially extending slots passing through the front and rear surfaces of each disc and in communication with said center aperture, each one of said second plurality of discs being located between a pair of said first plurality of washers, the center apertures of said first plurality of washers being lined up with the center apertures of said second plurality of discs; and outlet means for permitting the laminar fluid to flow out an output portion of said flow restrictor, said outlet means comprising all the center apertures of said first plurality of washers and said second plurality of discs and said plurality of radially extending slots in communication with said center apertures of said second plurality of discs.

2. The apparatus of claim 1 wherein said first plurality of washers being smaller in diameter than said second plurality of discs.

3. The apparatus of claim 2 wherein said first plurality of washers having a diameter approximately 80% the diameter of said second plurality of discs.

4. The apparatus of claim 1 wherein each one of said plurality of radially extending slots of each of said second plurality of discs extending from said center aperture of each of said second plurality of discs to a point spaced from the outer peripheral surface of each of said second plurality of discs.

5. The apparatus of claim 4 wherein said first plurality of washers being smaller in diameter than said second plurality of discs.

6. The apparatus of claim 5 wherein a portion of each one of said plurality of radially extending slots of each of said second plurality of discs being above the peripheral surface of each of said pair of said first plurality of washers.

7. The apparatus of claim 6 wherein a capillary channel is defined by each one of said plurality of radially extending slots in each of said second plurality of discs and by one of said pair of washers being in contact with the front surface and the other of said pair of washers being in contact with the rear surface of each disc located between its pair of washers, the input portion of said capillary channel being said portion of each one of said plurality of radially extending slots of each disc located above the peripheral surfaces of said pair of washers in contact with each disc, the output portion of said capillary channel being said center aperture of said disc.

8. A method for creating laminar fluid flow in a flow meter comprising the steps of:
providing a first plurality of washers each having a center aperture;
providing a second plurality of discs each having a center aperture and a plurality of slots extending radially from said center aperture of said disc and passing through the front and rear surfaces of said disc; and
forming flow restrictor to create laminar fluid flow in a flow meter by alternately stacking washers and discs together with each disc being between two washers thereby providing, in combination, a plurality of channels in each of said discs for carrying fluid through each of said discs for creating laminar fluid flow.

9. A method in accordance with claim 8 wherein each of said discs having a larger diameter than each of said washers.

10. A method in accordance with claim 9 wherein each of said channels extending beyond the peripheral outer surface of each washer to provide a fluid inlet and the center aperture of each of said discs being part of a fluid outlet for said flow restrictor.

* * * * *